(12) United States Patent
Hachisuga et al.

(10) Patent No.: US 9,522,799 B2
(45) Date of Patent: Dec. 20, 2016

(54) TRANSPORT DEVICE AND TRANSPORT SYSTEM

(71) Applicant: FUJI XEROX CO., LTD., Tokyo (JP)

(72) Inventors: Masaki Hachisuga, Kanagawa (JP); Takao Furuya, Kanagawa (JP); Seigo Makida, Kanagawa (JP); Kazuya Fukunaga, Kanagawa (JP); Takashi Hiramatsu, Kanagawa (JP); Kiyofumi Aikawa, Kanagawa (JP); Hideki Moriya, Kanagawa (JP); Michio Kikuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/709,545

(22) Filed: May 12, 2015

(65) Prior Publication Data

US 2016/0130101 A1 May 12, 2016

(30) Foreign Application Priority Data

Nov. 7, 2014 (JP) .................................. 2014-227363

(51) Int. Cl.
| | |
|---|---|
| *H04N 1/04* | (2006.01) |
| *B65H 5/06* | (2006.01) |
| *B65H 7/02* | (2006.01) |
| *B65H 7/20* | (2006.01) |
| *H04N 1/12* | (2006.01) |

(Continued)

(52) U.S. Cl.
CPC ............... *B65H 5/068* (2013.01); *B65H 7/02* (2013.01); *B65H 7/20* (2013.01); *H04N 1/00588* (2013.01); *H04N 1/00602* (2013.01); *H04N 1/00615* (2013.01); *H04N 1/0476* (2013.01); *H04N 1/123* (2013.01)

(58) Field of Classification Search
None
See application file for complete search history.

(56) References Cited

U.S. PATENT DOCUMENTS 5,157,520 A * 10/1992 Tanaka .................. B65H 5/062
355/75
5,540,426 A * 7/1996 Nakamura ............. B65H 5/062
271/265.01

(Continued)

FOREIGN PATENT DOCUMENTS

| JP | 2006-245927 A | 9/2006 |
|---|---|---|
| JP | 2006-270819 A | 10/2006 |
| JP | 2015-048189 A | 3/2015 |

*Primary Examiner* — Cheukfan Lee
(74) *Attorney, Agent, or Firm* — Sughrue Mion, PLLC

(57) ABSTRACT

Provided is a transport device including plural rollers that are provided on a transporting path on which a sheet is transported in a transport direction and is subjected to a process at a process position, and transport the sheet which comes into contact with surfaces of the rollers in the transport direction by rotation of the rollers, among the plural rollers, first rollers that are provided closest to the process position, among the plural rollers, second rollers that are provided closest to the first rollers on an opposite side with respect to the process position, and a driving unit that drives the first rollers and the second rollers to rotate so that a speed of a surface of the first roller is faster than a speed of a surface of the second roller at least while the sheet passes through the process position.

16 Claims, 7 Drawing Sheets

(51) Int. Cl.
*H04N 1/047* (2006.01)
*H04N 1/00* (2006.01)

(56) References Cited

U.S. PATENT DOCUMENTS

| | | | |
|---|---|---|---|
| 6,338,481 B1 * | 1/2002 | Maruchi | B65H 29/70 |
| | | | 271/188 |
| 2006/0197997 A1 | 9/2006 | Oshida et al. | |
| 2010/0109229 A1 * | 5/2010 | Iwakawa | B65H 5/062 |
| | | | 271/10.13 |
| 2010/0226667 A1 * | 9/2010 | Ogihara | G03G 15/6573 |
| | | | 399/45 |
| 2013/0250279 A1 * | 9/2013 | Yano | G01N 21/57 |
| | | | 356/51 |
| 2015/0061209 A1 | 3/2015 | Hachisuga et al. | |
| 2016/0023857 A1 * | 1/2016 | Nakata | B65H 5/062 |
| | | | 271/227 |

* cited by examiner

FIG. 6

| STATE OF SHEET AT FIRST POSITION | ROLLER | | | | | | |
|---|---|---|---|---|---|---|---|
| | 10-1~ 10-5 | 10-6 (105) | 10-7 (106) | 10-8 | 10-9 (108) | 10-10 (107) | 10-11 ~ 10-14 |
| DURING PASSAGE | V1 | V1 | V2 | V2 | V2 | V2 | V1 |
| BEFORE OR AFTER PASSAGE | V1 | V3 | V3 | V3 | V3 | V1 | V1 |

| ROLLER | | | | | | |
|---|---|---|---|---|---|---|
| 10-1~ 10-5 | 10-6 (105) | 10-7 (106) | 10-8 | 10-9 (108) | 10-10 (107) | 10-11~ 10-14 |
| V1 | V1 | V2 | V2 | V2 | V4 | V4 |

TRANSPORT DEVICE AND TRANSPORT SYSTEM

CROSS-REFERENCE TO RELATED APPLICATIONS

This application is based on and claims priority under 35 USC 119 from Japanese Patent Application No. 2014-227363 filed Nov. 7, 2014.

BACKGROUND

Technical Field

The present invention relates to a transport device and a transport system.

SUMMARY

According to an aspect of the invention, there is provided a transport device including:

plural rollers that are provided on a transporting path on which a sheet is transported in a transport direction and is subjected to a process at a process position, and transport the sheet which comes into contact with surfaces of the rollers in the transport direction by rotation of the rollers;

among the plural rollers, first rollers that are provided closest to the process position on a downstream side in the transport direction of the process position;

among the plural rollers, second rollers that are provided closest to the first rollers on an opposite side with respect to the process position in the transport direction when viewed from the first rollers; and a driving unit that drives the first rollers and the second rollers to rotate so that a speed of a surface of the first roller is faster than a speed of a surface of the second roller at least while the sheet passes through the process position.

BRIEF DESCRIPTION OF THE DRAWINGS

Exemplary embodiments of the present invention will be described in detail based on the following figures, wherein:

FIG. 6 is a view illustrating an example of a surface speed table;

DETAILED DESCRIPTION

[1] Exemplary Embodiment

Figure 1:
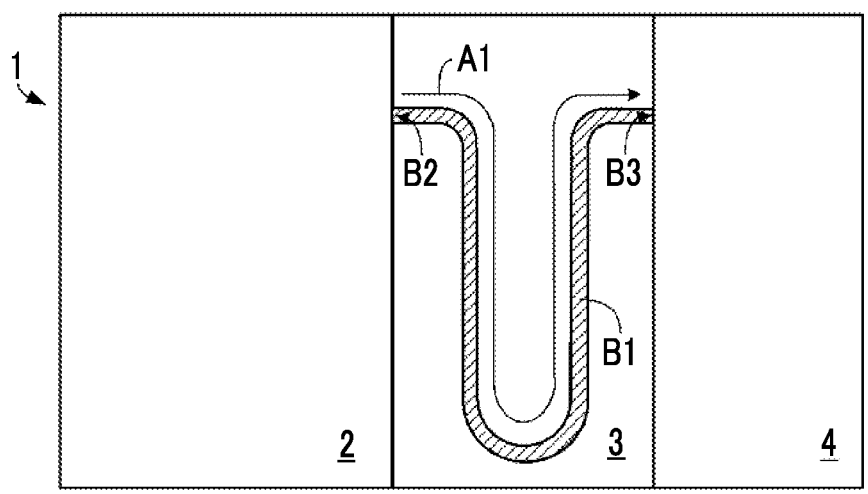
FIG. 1 is a view illustrating the overall configuration of an image inspection system according to an exemplary embodiment.

FIG. 1 illustrates the overall configuration of an image inspection system 1 according to an exemplary embodiment. The image inspection system 1 includes an image forming apparatus 2, a transport device 3, and a post-processing device 4. The transport device 3 is an example of a "transport device" of the invention. The devices are connected to each other by lines (not illustrated), and data is exchanged between the devices via the lines.

The image forming apparatus 2 forms an image on a sheet such as paper, a cardboard, or an overhead projector (OHP) film in, for example, an electrophotographic method. In addition, the method of forming an image is not limited thereto, and an ink jet method, a thermal transfer method, or the like may also be employed. The image forming apparatus 2 forms images on both surfaces of a sheet, and discharges the sheet on which the images are formed to the transport device 3. In addition, the image forming apparatus 2 transmits image data which is used for the image formation to the post-processing device 4.

The transport device 3 transports the sheet which is discharged from the image forming apparatus 2 to the post-processing device 4 along a transporting path B1. The transporting path B1 is formed to extend from an entrance port B2 on the image forming apparatus 2 side toward the post-processing device 4 side in a horizontal direction, bend downward in a vertical direction, and draw a "U" shape. Thereafter, the transporting path B1 is bent in the horizontal direction and extends to an exit port B3 on the post-processing device 4 side. The transport device 3 reads the images which are formed on both surfaces of the sheet while transporting the sheet. When the images are read, the transport device 3 transmits result data which indicates the result to the post-processing device 4.

The post-processing device 4 performs a predetermined post-process on the sheet discharged from the transport device 3. In this exemplary embodiment, the post-processing device 4 performs, as the post-process, a process of sorting sheets into sheets on which images are accurately formed and sheets on which images are not accurately formed. For example, the post-processing device 4 calculates the degree of similarity between an image indicated by the image data transmitted from the image forming apparatus 2 and an image indicated by the result data transmitted from the transport device 3, and determines that the image is accurately formed on the sheet when the calculated degree is greater than a threshold. The image inspection system 1 inspects the images formed on the sheet by the above-described function of each of the devices.

Figure 2:
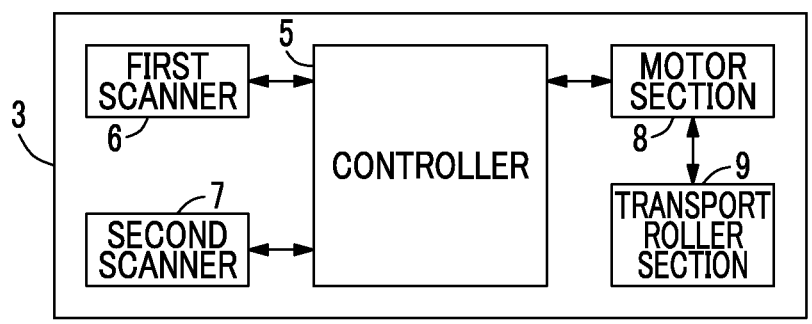
FIG. 2 is a view illustrating the hardware configuration of a reading device.

FIG. 2 illustrates the hardware configuration of the transport device 3. The transport device 3 includes a controller 5, a first scanner 6, a second scanner 7, a motor section 8, and a transport roller section 9. The controller 5 includes, in addition to a central processing unit (CPU) and a random-access memory (RAM), a storage unit such as a read-only memory (ROM) or a hard disk. The CPU uses the RAM as a work area, and controls each unit by executing programs stored in the storage unit. The first scanner 6 and the second scanner 7 scan the sheet which is transported along the transporting path B1 illustrated in FIG. 1 so as to perform a process of reading (hereinafter, referred to as "reading process") the images formed on the sheet.

The transport roller section 9 includes plural rollers, and each of the rollers is supported to rotate about its own rotation shaft. As the plural rollers rotate, the sheet which comes into contact with the surfaces of the rollers is transported in a transport direction A1 illustrated in FIG. 1. The motor section 8 includes motors, gears, and the like, and drives each of the plural rollers included in the transport roller section 9 so as to rotate. The motor section 8 is controlled by the controller 5 so as to rotate each of the rollers at a speed instructed by the controller 5.

Figure 3:
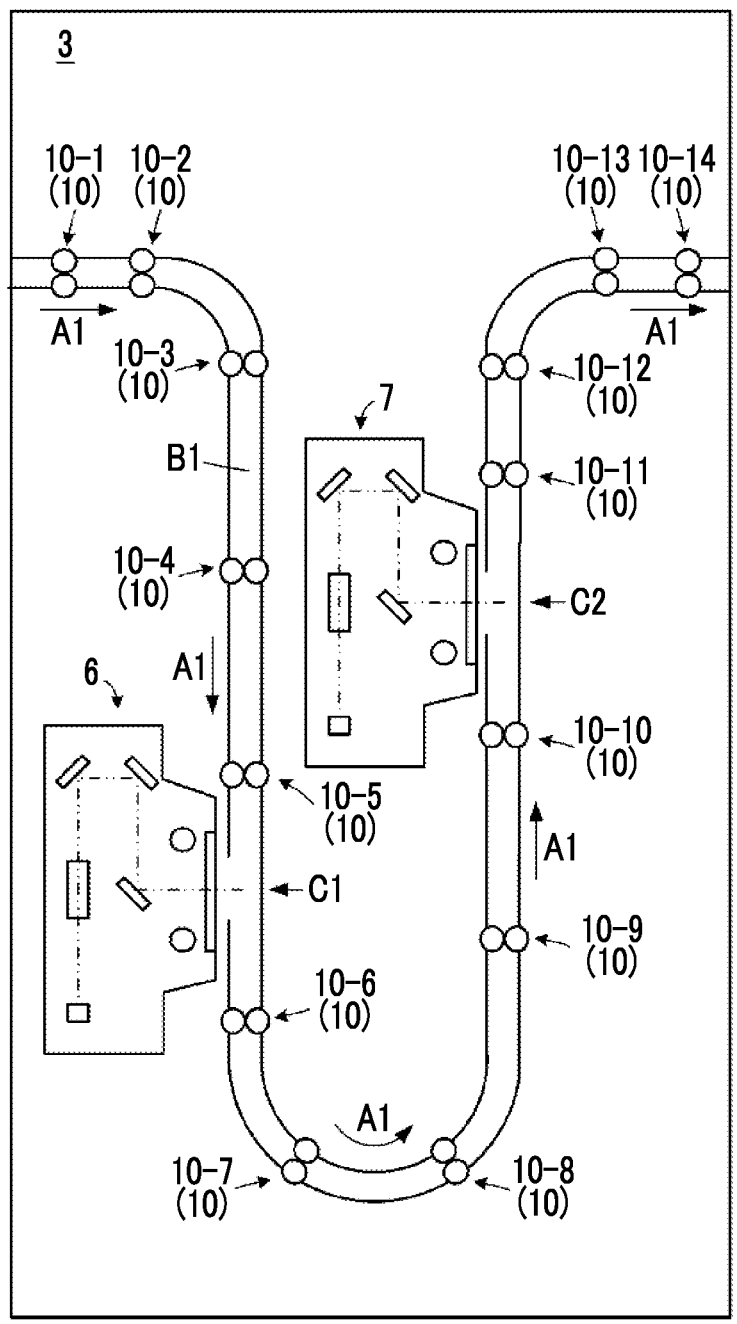
FIG. 3 is a view illustrating the detailed configuration of a transport roller section.

FIG. 3 illustrates the specific configuration of the transport roller section 9. The transport roller section 9 includes fourteen roller sections (referred to "roller sections 10" when the fourteen roller sections are not distinguished from each other) including roller sections 10-1, 10-2, . . . , 10-14. The roller sections are provided to be sequentially arranged along the transporting path B1 from the entrance port B2 to the exit port B3. The distances between the adjacent roller sections 10 are shorter than the size of a sheet which is shortest in size in the transport direction A1 such that any one of the roller sections 10 reliably comes into contact with the sheet.

The first scanner 6 performs the reading process of reading the image by scanning the sheet at a first position C1 of the transporting path B1. The first position C1 is a position on the downstream side of the roller section 10-5 in the transport direction A1 and on the upstream side of the roller section 10-6 in the transport direction A1. At the first position C1, an opening which connects the transporting path B1 to an external space is provided, and the first scanner 6 emits light through the opening and performs the reading process. The second scanner 7 performs the reading process of reading the image by scanning the sheet at a second position C2 of the transporting path B1. The second position C2 is a position on the downstream side of the roller section 10-10 in the transport direction A1 and on the upstream side of the roller section 10-11 in the transport direction A1. At the second position C2, an opening which connects the transporting path B1 to an external space is provided, and the second scanner 7 emits light through the opening and performs the reading process.

Both of the first position C1 and the second position C2 are positions (hereinafter, referred to as "process positions") where the process is performed on the sheet transported on the transporting path B1. That is, in this exemplary embodiment, the process positions include the first position C1 which is a first process position, and the second position C2 which is a second process position positioned closer to the downstream side in the transport direction A1 than the first position C1. In this exemplary embodiment, the distance between the first position C1 and the second position C2 in the transport direction A1 is longer than the size of a largest sheet.

Figure 4:
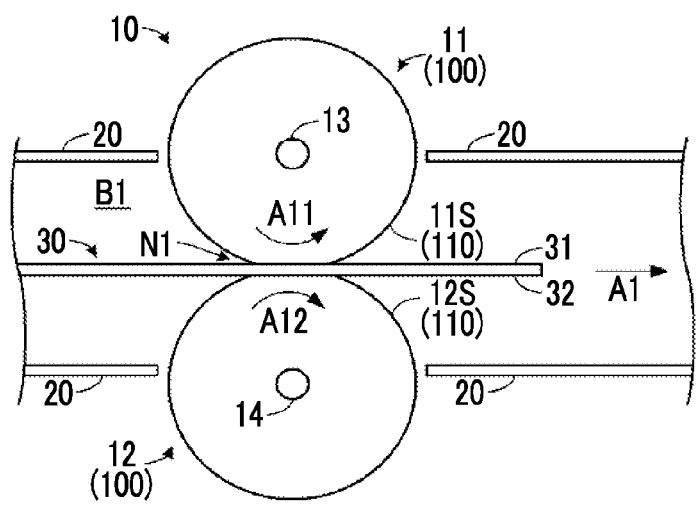
FIG. 4 is an enlarged view of a roller section.

FIG. 4 is an enlarged view of the roller section 10. The roller section 10 includes a pair of rollers which are a roller 11 and a roller 12 (referred to as "rollers 100" in a case where the rollers are not distinguished from each other), and the roller 11 and the roller 12 form a nip area N1. The roller 11 rotates about a shaft 13 in a rotational direction A11 indicated by arrow in the figure, and the roller 12 rotates about a shaft 14 in a rotational direction A12 indicated by arrow in the figure. The roller section 10 is provided so that the nip area N1 is present on the transporting path B1. The transporting path B1 is formed by a guide member 20. The guide member 20 is a member which guides the sheet along the transporting path B1.

The roller 100 has a columnar (or cylindrical) shape. The roller 11 includes an outer peripheral surface 11S, and the roller 12 includes an outer peripheral surface 12S. The outer peripheral surfaces are referred to as "surfaces 110 of the rollers" in a case where the outer peripheral surfaces are not distinguished from each other. In FIG. 4, a sheet 30 during passage through the nip area N1 is illustrated. A first surface 31 of the sheet 30 comes into contact with the outer peripheral surface 11S of the roller 11 in the nip area N1, and a second surface 32 comes into contact with the outer peripheral surface 12S of the roller 12 in the nip area N1. When the roller 100 is driven by the motor section 8 illustrated in FIG. 2 to rotate about the rotation shaft (the shaft 13 or 14), the sheet 30 which comes into contact with the surface 110 (the outer peripheral surface 11S or 12S) of the roller 100 is transported in the transport direction A1. The plural rollers 100 described above are provided on the transporting path B1.

When slipping of the surface 110 on the sheet 30 does not occurs, the sheet 30 which comes into contact with the surface 110 of the rotating roller 100 is transported in the transport direction A1 at a speed (hereinafter, referred to as a "surface speed") at which the surface 110 is moved in the transport direction A1 in the nip area N1. The surface speed is increased as the roller 100 rapidly rotates, and thus a speed (hereinafter, referred to as a "transport speed") at which the sheet 30 is transported in the transport direction A1 is also increased as the roller 100 rapidly rotates. Here, when a force to pull the sheet 30 toward the upstream side or the downstream side in the transport direction A1 is exerted on the sheet 30, there may be a case where slipping of the surface 110 on the sheet 30 occurs. In this case, for example, the transport speed becomes lower than the surface speed when the sheet 30 is pulled toward the upstream side, and the transport speed becomes higher than the surface speed when the sheet 30 is pulled toward the downstream side. The pulling force is generated, for example, in a case where the surface speeds of the rollers 100 which are respectively included in the adjacent roller sections 10 are different from each other.

The controller 5 of the transport device 3 illustrated in FIG. 2 controls each of the units by performing the programs, and thus the following functions are realized.

Figure 5:
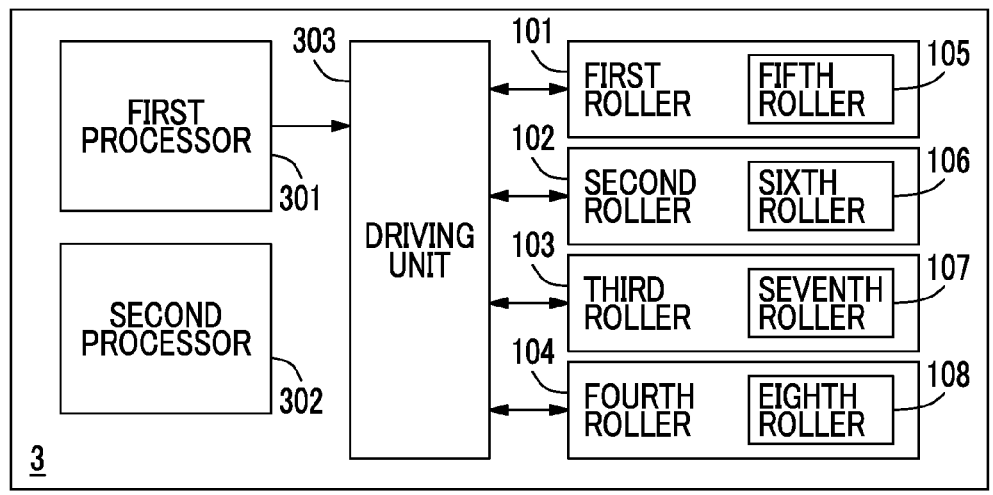
FIG. 5 is a view illustrating the functional configuration of a transport device.

FIG. 5 illustrates the functional configuration of the transport device 3. The transport device 3 includes a first processor 301, a second processor 302, and a driving unit 303. The first processor 301 performs a process on the sheet at the first position C1 of the transporting path B1 on which the sheet is transported in the transport direction A1. The second processor 302 performs a process on the sheet at the second position C2 of the transporting path B1. Both of the first processor 301 and the second processor 302 in this exemplary embodiment perform the above-described reading process by scanning the sheet at a same speed. More specifically, the first processor 301 and the second processor 302 have light sources and image sensors, and perform the reading process by emitting light from the light sources toward the sheet and then receiving the reflected light by the image sensors.

In addition, the first processor 301 notifies the driving unit 303 of whether or not the sheet is "during passage" through the first position C1. In this exemplary embodiment, the first processor 301 stores the intensity of the reflected light which is received by the above-described image sensor when the sheet does not pass through the first position C1, notifies the driving unit 303 of the passage of the sheet in a case of receiving the reflected light having the intensity stored in the image sensor, and notifies the driving unit 303 of the absence of the sheet at the first position C1 in a case of receiving the reflected light having another intensity.

The driving unit 303 drives each of the above-described plural rollers 100, that is, the plural rollers 100 which rotate to transport the sheets that come into contact with the surfaces of the rollers 100 in the transport direction A1 such that the plural rollers 100 rotate about their own rotation shafts. Particularly, the driving unit 303 drives first rollers 101, second rollers 102, third rollers 103, and fourth rollers 104 among the plural rollers 100 in a specific method, which will be described later.

The driving unit 303 drives, among the plural rollers 100, the rollers 100 which are provided closest to the process positions on the downstream sides in the transport direction A1 from the process positions (the first position C1 and the second position C2 in this exemplary embodiment) as the first rollers 101. The term "closest to the process position" mentioned above indicates that the distance from the process position along the transporting path B1 is shortest. Here, regarding the rollers 100 forming a pair, even when one roller 100 is strictly closer to the process position than the other roller 100, it is assumed that both of the rollers 100 are provided "closest to the process position".

The driving unit 303 drives, among the plural rollers 100, the rollers 100 which are provided closest to the first rollers 101 on the opposite sides to the process positions in the transport direction A1 when viewed from the first rollers 101 as the second rollers 102. In addition, among the plural rollers 100, the driving unit 303 drives the rollers 100 which are provided closest to the process positions on the upstream sides from the process positions as the third rollers 103, and drives the rollers 100 which are provided closest to the third rollers 103 on the opposite sides to the process positions when viewed from the third rollers 103 as the fourth rollers 104.

In summary, the first rollers 101 are the rollers 100 which are included in the roller section 10-6 and the roller section 10-11, and the second rollers 102 are the rollers 100 which are included in the roller section 10-7 and the roller section 10-12. In addition, the third rollers 103 are the rollers 100 which are included in the roller section 10-5 and the roller section 10-10, and the fourth rollers 104 are the rollers 100 which are included in the roller section 10-4 and the roller section 10-9.

In addition, the driving unit 303 drives some of the first to fourth rollers in a more specific method. Specifically, the driving unit 303 drives, among the first rollers 101, those (included in the roller section 10-6) which are provided on the downstream side of the first position C1 that is the process position on the upstream side as fifth rollers 105, and drives the second rollers 102 (included in the roller section 10-7) which are provided on the downstream side of the fifth roller 105 as sixth rollers 106. In addition, the driving unit 303 drives, among the third rollers 103, those (included in the roller section 10-10) which are provided on the upstream side of the second position C2 that is the process position on the downstream side as seventh rollers 107, and drives the fourth rollers 104 (included in the roller section 10-9) which are provided on the upstream side of the seventh roller 107 as eighth rollers 108.

For example, the driving unit 303 stores a surface speed table in which the surface speed (the speed of the surface 110 of the roller 100 illustrated in FIG. 4 which moves in the transport direction A1 in the nip area N1) of each of the above-described rollers 100 when the rollers 100 are driven to rotate is determined.

FIG. 6 illustrates an example of the surface speed table. In the table, the surface speed for each state of the sheet 30 at the first position C1 is determined. As the state of the sheet 30, "during passage" which indicates a state of passage through the first position C1 and "before or after passage" which indicates a state of before passage or after passage are illustrated. In this example, the surface speeds of the rollers 100 included in the roller sections "10-1 to 10-5", "10-6", "10-7", "10-8", "10-9", "10-10", and "10-11 to 10-14" respectively correspond to "V1", "V1", "V2", "V2", "V2", "V2" and "V1" in the case of "during passage", and respectively correspond to "V1", "V3", "V3", "V3", "V3", "V1", and "V1" in the case of "before or after passage". V1 is a surface speed which is faster than V2 and slower than V3. That is, a relationship of V2<V1<V3 is formed.

As described above, the driving unit 303 is notified of whether or not the sheet 30 is "during passage" through the first position C1 by the first processor 301. The driving unit 303 drives each of the rollers 100 to rotate at the surface speeds corresponding to "during passage" in the surface speed table when notified of the intent of during passage, and drives each of the rollers 100 to rotate at the surface speeds corresponding to "before or after passage" when notified of the intent of not "during passage".

Specifically, the driving unit 303 drives the fifth rollers 105 (the pair of rollers 100 included in the roller section "10-6") to rotate at the surface speed "V1" "during passage" and to rotate at the surface speed "V3" "before or after passage", and drives the sixth rollers 106 (the pair of rollers 100 included in the roller section "10-7") to rotate at the surface speed "V2" "during passage" and to rotate at the surface speed "V3" "before or after passage".

As described above, at least when the sheet 30 passes through the first position C1, the driving unit 303 drives the fifth rollers 105 and the sixth rollers 106 so that the surface speed ("V1" in this example) of the fifth roller 105 is faster than the surface speed ("V2" in this example) of the sixth rollers 106.

In addition, the driving unit 303 drives the eighth rollers 108 (the pair of rollers 100 included in the roller section "10-9") to rotate at the surface speed "V2" "during passage" and to rotate at the surface speed "V3" "before or after passage", and drives the seventh rollers 107 (the pair of rollers 100 included in the roller section "10-10") to rotate at the surface speed "V2" "during passage" and to rotate at the surface speed "V1" "before or after passage". As described above, at least after the sheet 30 passes through the first position C1, the driving unit 303 drives the seventh rollers 107 and the eighth rollers 108 so that the surface speed of the seventh roller 107 is set to the surface speed ("V1" in this example) of the fifth roller 105 and the surface speed ("V3" in this example) of the eighth roller 108 is faster than the surface speed of the seventh roller 107.

As described above, even in a case where the driving unit 303 drives the fifth rollers 105 as the first rollers 101 and drives the sixth rollers 106 as the second rollers 102 and even in a case where the driving unit 303 drives the seventh rollers 107 as the first rollers 101 and drives the eighth rollers 108 as the second rollers 102, the driving unit 303 drives the first rollers 101 and the second rollers 102 so that the surface speeds of the rollers (the fifth rollers 105 and the eighth rollers 108) on the upstream side among the first rollers 101 and the second rollers 102 are faster than the surface speeds of the rollers (the sixth rollers 106 and the seventh rollers 107) on the downstream side.

When the driving unit 303 drives the rollers 100 in this manner, on the transporting path B1 interposed between the first rollers 101 and the second rollers 102, the surface speed of the roller 100 on the downstream side is slow, and thus a bend occurs in the sheet 30.

Figure 7A:
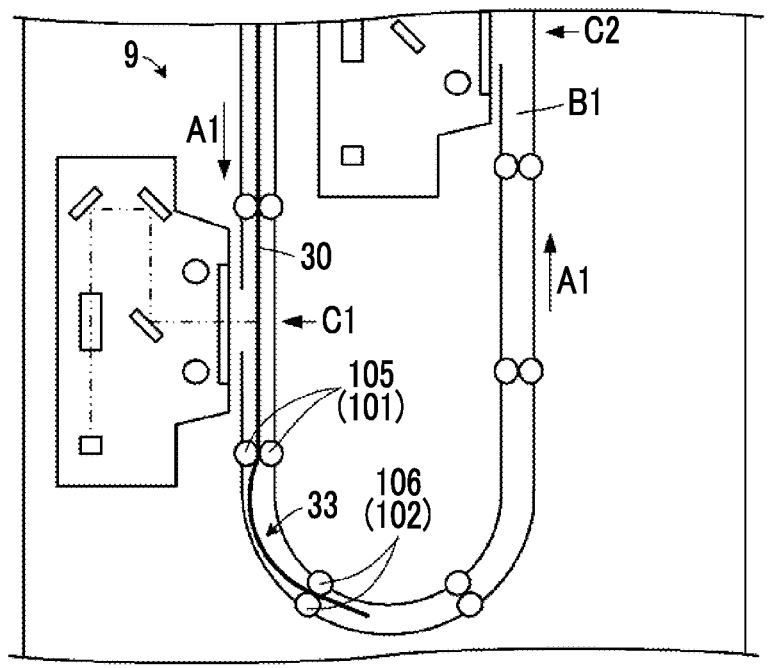
FIGS. 7A and 7B are views illustrating an example of a bend which occurs in a sheet.
Figure 7B:
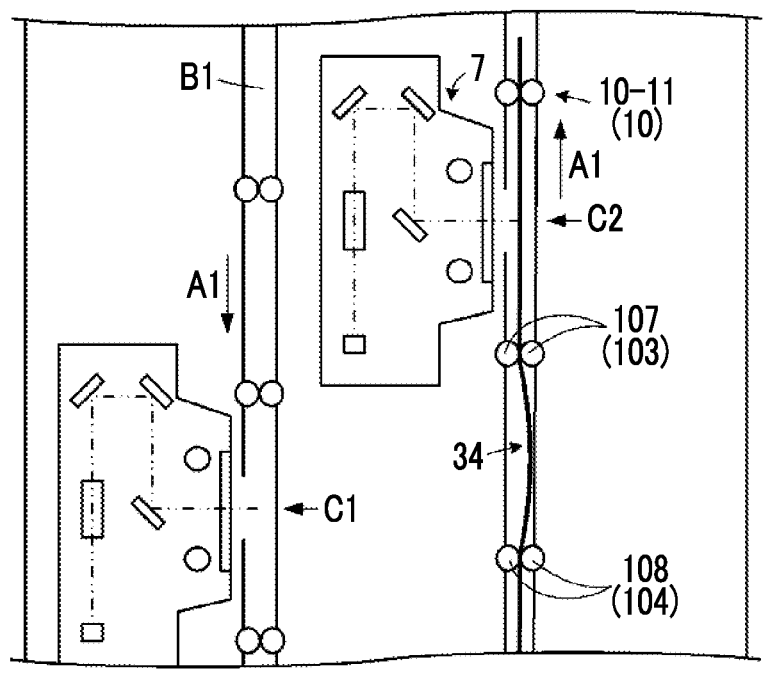

FIGS. 7A and 7B illustrate an example of a bend which occurs in the sheet 30. In FIG. 7A, a bend 33 which occurs in a state where the fifth rollers 105 and the sixth rollers 106 are transporting the sheet 30 is illustrated. The bend 33 occurs on the transporting path B1 on the downstream side of the fifth roller 105 and the upstream side of the sixth roller 106. In FIG. 7B, a bend 34 which occurs in a state where the seventh rollers 107 and the eighth rollers 108 are transporting the sheet 30 is illustrated. The bend 34 occurs on the transporting path B1 on the downstream side of the eighth roller 108 and the upstream side of the seventh roller 107.

Contrary to this exemplary embodiment, if the rollers 100 are driven so that the rollers 100 on the downstream side have a higher surface speed, the bend illustrated in FIGS. 7A and 7B does not occur, and the following event occurs in the sheet 30.

Figure 8A:
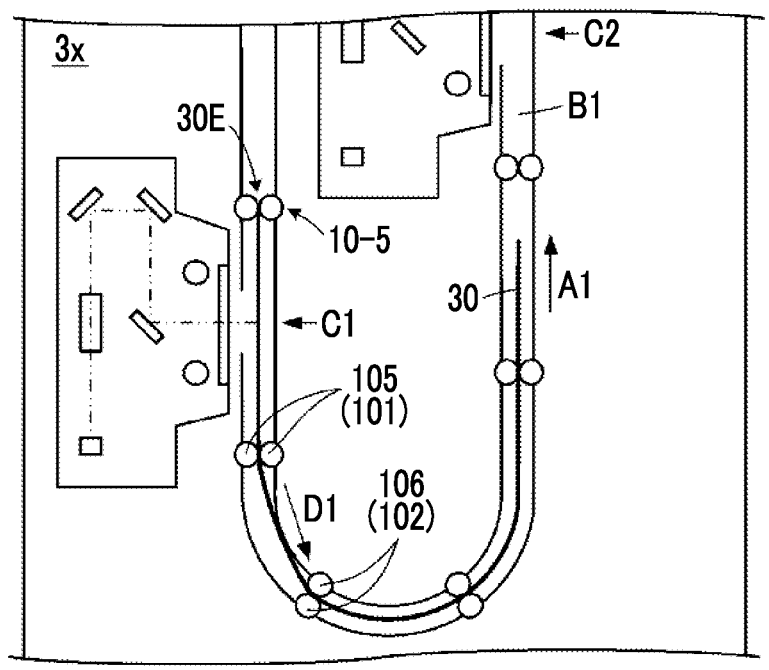
FIGS. 8A and 8B are views illustrating an event which occurs in the sheet.
Figure 8B:
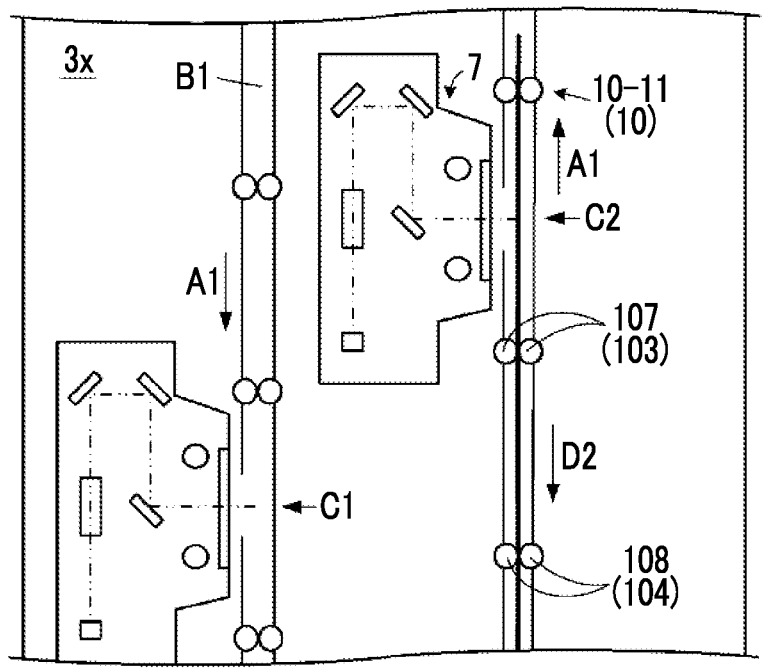

FIGS. 8A and 8B are views illustrating the event that occurs in the sheet 30. In FIGS. 8A and 8B, a transport device 3x which performs driving in the opposite manner to this exemplary embodiment is illustrated. That is, in the transport device 3x, the surface speed of the sixth roller 106 is faster than the surface speed of the fifth roller 105. Therefore, as illustrated in FIG. 8A, the sixth rollers 106 are in a state of exerting a force (a force exerted in a direction along arrow D1 in the figure, hereinafter, referred to as "pulling force") to pull the sheet 30 toward the downstream side in the transport direction A1.

When slipping of the sheet 30 occurs in the nip area of the fifth rollers 105 due to the pulling force, the transport speed of the fifth roller 105 is increased, and thus the speed (hereinafter, referred to as "process position speed") of the sheet 30 at the first position C1 in the transport direction A1 is also increased. Therefore, before and after slipping occurs, the process position speed is changed. Particularly, as illustrated in FIG. 8A, at a time when a rear end 30E of the sheet 30 passes through the roller section (roller section 10-5 in this example), the frictional force exerted by the roller section disappears, and thus the degree of slipping is increased due to the pulling force and the process position speed is more largely changed.

In addition, in the transport device 3x, the surface speed of the seventh roller 107 is faster than the surface speed of the eighth roller 108. Therefore, as illustrated in FIG. 8B, the eighth rollers 108 are in a state of generating a force (pulling force exerted in a direction along arrow D2 in the figure) to pull the sheet 30 toward the upstream side in the transport direction A1. When slipping of the sheet 30 occurs in the nip area of the seventh rollers 107 due to the pulling force, the transport speed of the seventh roller 107 is reduced, and thus the process position speed at the second position C2 is also reduced. Even in this case, before and after slipping occurs, the process position speed is changed.

In this exemplary embodiment, as illustrated in FIG. 7A, by allowing the bend 33 to occur, the pulling force due to the sixth roller 106 is not generated. Accordingly, compared to the case of driving the rollers 100 as in the transport device 3x, slipping of the sheet 30 is less likely to occur in the nip area of the fifth rollers 105, and thus a change in the process position speed at the first position C1 is less likely to occur. In addition, as illustrated in FIG. 7B, by allowing the bend 34 to occur, the pulling force due to the eighth roller 108 is not generated. Accordingly, compared to the case of driving the rollers 100 as in the transport device 3x, slipping of the sheet 30 is less likely to occur in the nip area of the seventh rollers 107, and thus a change in the process position speed at the second position C2 is less likely to occur.

As described above, in this exemplary embodiment, compared to the case where the surface speed of the roller on the downstream side is as fast as in the transport device 3x, variations in the speed of the sheet in the position where a process is performed on the sheet are suppressed. In addition, since the surface speeds are switched as described above depending on whether or not the sheet is "during passage" through the first position C1, even when a process is performed on sheet at the two positions including the first position C1 and the second position C2, variations in the speed of the sheet are suppressed. In addition, since the surface speed of the seventh roller 107 is set to the surface speed of the fifth roller 105 after the sheet passes through the first position C1, compared to the case where the surface speed of the seventh roller 107 is not changed, that is, the case where the transport speed of the sheet at the second position C2 is always slower than the transport speed of the sheet at the first position C1, the time for passing the sheet through the transport device is reduced.

[2] Modification Example

The above-described exemplary embodiment is only an example of the implementation of the invention, and may be modified as follows.

In addition, the above-described exemplary embodiment and modification examples which will be described as follows may be combined as necessary.

[2-1] Fixing of Surface Speed

In the exemplary embodiment, since the driving unit 303 switches the surface speeds depending on whether or not the sheet 30 is "during passage" through the first position C1, variations in the speed of the sheet at the two process positions are suppressed. However, other methods may also be used.

Figures 9, 10:
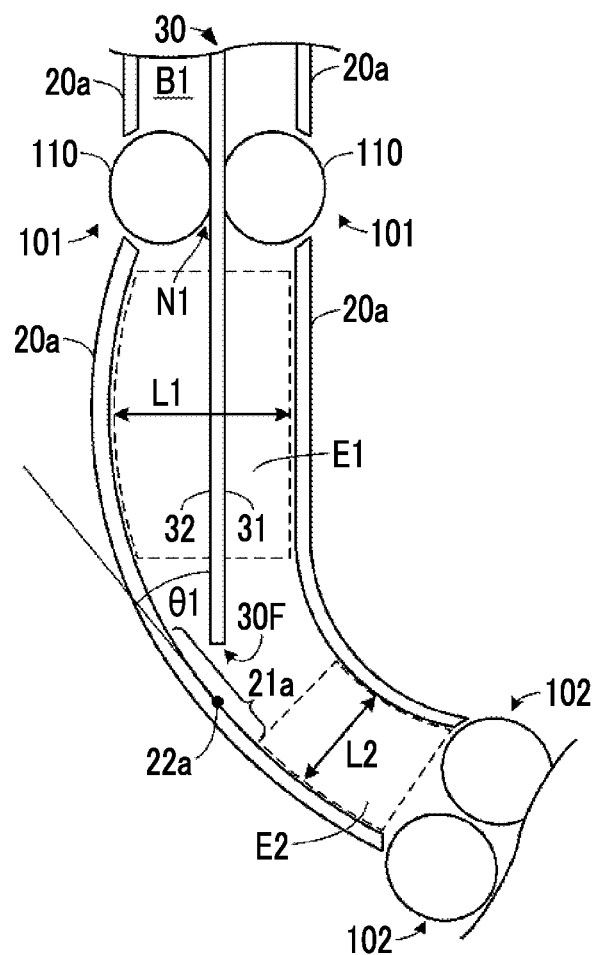
FIG. 9 is a view illustrating an example of a surface speed table of a modification example.
FIG. 10 is a view illustrating a guide member of the modification example.

FIG. 9 illustrates an example of the surface speed table of this modification example. In the surface speed table, the surface speeds of the rollers 100 included in each of the roller sections 10 are determined in only one way. In this example, the surface speeds of the rollers 100 included in the roller sections "10-1 to 10-5", "10-6", "10-7", "10-8", "10-9", "10-10", and "10-11 to 10-14" respectively correspond to "V1", "V1", "V2", "V2", "V2", "V4", and "V4". V4 is a surface speed which is slower than V2. That is, a relationship of V4<V2<V1 is formed.

The driving unit 303 drives the fifth rollers 105 and the sixth rollers 106 to rotate respectively at the surface speeds "V1" and "V2", and drives the eighth rollers 108 and the seventh rollers 107 to rotate respectively at the surface speeds "V2" and "V4". Even in this case, by the driving of the driving unit 303, among the first rollers 101 and the second rollers 102, the surface speeds of the rollers (the fifth rollers 105 and the eighth rollers 108) on the upstream side are faster than the surface speeds of the rollers (the sixth rollers 106 and the seventh rollers 107) on the downstream side. In addition, in this example, the surface speeds of the sixth roller 106 and the surface speed of the eighth roller 108 are equal to V2. However, as long as the relationship of the surface speeds is set as described above, for example, the surface speed of the eighth roller 108 may be faster than the surface speed of the sixth roller 106.

As described above, the driving unit 303 of this modification example drives the fifth rollers 105, the sixth rollers 106, the seventh rollers 107, and the eighth rollers 108 so that the surface speed of the fifth roller 105 is faster than the surface speed of the sixth roller 106, the surface speed of the sixth roller 106 is equal to or faster than the surface speed of the eighth roller 108, and the surface speed of the eighth roller 108 is faster than the surface speed of the seventh roller 107.

In this modification example, the second processor 302 performs the reading process by scanning the sheet 30 at the second position C2 at a slower speed than that of the first processor 301. More specifically, when the process position speed at the first position C1 is X times the process position speed at the second position C2, the second processor 302 performs the reading process so that the scanning speed of the first processor 301 in the reading process is X times the scanning speed of the second processor 302 in the reading process. The ratio between the process position speeds at the first position C1 and the second position C2 is represented by the ratio (hereinafter, referred to as "surface speed ratio") of the surface speed of the seventh roller 107 to the surface speed of the fifth rollers 105 in a case where slipping of the fifth rollers 105 and the seventh rollers 107 on the sheet 30 does not occur. Therefore, the second processor 302 may perform the reading process at a scanning speed obtained by multiplying the scanning speed of the first processor 301 in the reading process by the surface speed ratio. In this modification example, even when the surface speeds of the rollers 100 are not switched, variations in the speed of the sheet is suppressed as in the above-described exemplary embodiment.

[2-2] Acceleration of Bend

In the exemplary embodiment, the sheet is allowed to bend by changing the surface speeds of the first roller 101 and the second roller 102. However, the sheet may be allowed to easily bend by the shape of the guide member.

FIG. 10 illustrates a guide member 20a of this modification example. The guide member 20a guides the sheet from the rollers (the first rollers 101 in this example) on the upstream side to the rollers (the second rollers 102 in this example) on the downstream side among the first rollers 101 and the second rollers 102 along the transporting path B1.

The guide member 20a includes a collision surface 21a which is provided at a position where a tip end 30F of the sheet 30 transported by the first rollers 101 which are the rollers on the upstream side collides with the guide member. In a surface which is included in the guide member 20a and faces the transporting path B1, the collision surface 21a is a surface which includes a portion that intersects a virtual plane which comes into contact with the surface 110 of the first roller 101 in the nip area N1 of the first rollers 101. When the sheet 30 which is transported by the first rollers 101 advances without being bent, the sheet 30 advances while overlapping the above-described virtual plane, and thus the tip end 30F collides with the portion.

The collision surface 21a and the sheet 30 form an angle θ1 when the tip end 30F of the sheet 30 collides with the collision surface 21a. When θ1 is too close to 90°, there is concern that the sheet 30 may be bent and block the transporting path B1, and thus the collision surface 21a may be formed so that θ1 is, for example, equal to or less than 45°. The tip end 30F of the sheet 30 which collides with the collision surface 21a advances along the collision surface 21a in a direction away from the above-described virtual plane, and as a result, a bend occurs in the sheet 30. As described above, since the collision surface 21a is provided, compared to a case where the collision surface 21a is not provided in a path to the rollers 100 on the downstream side, the sheet 30 which is transported by the rollers 100 on the upstream side is easily bent.

In addition, in the guide member 20a, a space E1 which is wider than a space E2 formed on the downstream side of the collision surface 21a is formed on the upstream side of the collision surface 21a. In FIG. 10, the spaces E1 and E2 are illustrated which are respectively enclosed by dotted lines. When the distance between the guide member 20a on the first surface 31 side of the sheet 30 and the guide member 20a on the second surface 32 side is referred to as "the width of the transporting path B1", the width of the space E2 is about L2 at any position. Contrary to this, in the space E1, the width of the transporting path B1 is equal to or greater than L2 at any position and is L1 which is about 1.5 times L2 at the maximum.

Accordingly, compared to the case where the width of the transporting path B1 is not changed between the upstream side and the downstream side of the collision surface 21a, even when a bend occurs in the sheet 30 which collides with the collision surface 21a, the bent portion is less likely to come into contact with the guide member 20a. Therefore, slipping at a position where the first rollers 101 and the sheet 30 come into contact with each other, for example, due to the frictional force generated by the contact with the guide member 20a, is less likely to occur.

In addition, in the example of FIG. 10, when the sheet 30 which collides with the collision surface 21a is bent, the second surface 32 side swells. However, the width of the transporting path B1 in the space E1 on the second surface 32 side is greater than that on the first surface 31 side. Accordingly, for example, compared to a case where the relationship of the widths of the transporting path B1 is opposite (the width on the second surface 32 side is smaller than that on the first surface 31 side), the sheet 30 and the guide member 20a are less likely to come into contact with each other.

[2-3] Process Performed on Sheet

In the exemplary embodiment, the process of reading the images of the sheet is performed. However, the process is not limited thereto, for example, a process of ejecting ink onto a sheet may be performed, and a secondary transfer process may also be performed during image formation in the electrophotographic method. In any case, a processor having a function of performing such a process may be provided to perform the process on the sheet at the process position. Particularly, in a case where the transport speed of the sheet at the process position easily affects the result of the process, by applying the invention, as in the exemplary embodiment, variations in the transport speed at the process position are suppressed and thus the accuracy of the process is enhanced.

[2-4] Processor

In the exemplary embodiment, the transport device includes the two processors. However, the transport device is not limited thereto and may include a single processor or may also include three or more processors. In addition, at the process position on the transporting path of the transport device, a processor included in an external device may perform a process on the sheet. In summary, any processor may be used as long as the processor performs the process on the sheet transported on the transporting path at the process position. Even when any processor is used, since the driving unit 303 drives the rollers 100 as described above, variations in the speed of the sheet at the process position may be suppressed as in the exemplary embodiment.

[2-5] First and Second Rollers

In the exemplary embodiment, the rollers 100 included in the roller section 10-6 illustrated in FIG. 3 are driven in the above-described specific method. However, the rollers 100 included in the roller section 10-11 may also be driven in the same method. In this case, the rollers 100 included in the roller section 10-12 may be driven in the same method as that of the rollers 100 included in the roller section 10-7. In this case, a bend occurs in the sheet on the downstream side of the roller section 10-11, and thus the roller section 10-12 does not pull the sheet which passes through the second position C2 in the transport direction A1. As described above, driving may be performed in the specific method on both of the upstream side and the downstream side of the second position C2.

[2-6] Third Roller and Fourth Roller

In the embodiment, the rollers 100 included in the roller section 10-10 illustrated in FIG. 3 are driven by the above-described specific method. However, in addition, the rollers 100 included in the roller section 10-5 may be driven in the same method. In this case, the rollers 100 included in the roller section 10-4 may be driven in the same method as that of the rollers 100 included in the roller section 10-9. In this case, a bend occurs in the sheet on the upstream side of the roller section 10-5, and thus the roller section 10-4 does not pull the sheet which passes through the first position C1 in the opposite direction to the transport direction A1. As described above, driving may be performed by the specific method on both the upstream side and the downstream side of the first position C1.

[2-7] Transporting Path

In the exemplary embodiment, the sheet is transported on the U-shaped transporting path B1. However, the transporting path is not limited thereto, and the sheet may be transported on a linear transporting path or the sheet may be transported on a transporting path having other shapes. In addition, the transporting path may also be formed along any of the vertical direction, the horizontal direction, and a direction inclined therefrom.

[2-8] Category of Invention

The invention is considered as the transport device and the image inspection system provided with the transport device. In addition, the invention may be considered as an inspection device or an image reading device which outputs reading results in a case where the processor performs the process of reading an image, and the invention may be considered as an image forming apparatus in a case where the processor performs a process of ejecting ink or a secondary transfer process. The invention may also be applied to any device which performs a process on a transported sheet and in which it is desirable to stabilize the transport speed at which the sheet is transported at the process position.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transport device comprising:
a plurality of rollers that are provided on a transporting path on which a sheet is transported in a transport direction and is subjected to a process at a process position, and transport the sheet which comes into contact with surfaces of the rollers in the transport direction by rotation of the rollers;
among the plurality of rollers, first rollers that are provided closest to the process position on a downstream side in the transport direction of the process position;
among the plurality of rollers, second rollers that are provided closest to the first rollers on an opposite side with respect to the process position in the transport direction when viewed from the first rollers; and
a driving unit that drives the first rollers and the second rollers to rotate so that a speed of a surface of the first roller is faster than a speed of a surface of the second roller at least while the sheet passes through the process position,
wherein:
among the plurality of rollers, third rollers are provided closest to the process position on an upstream side of the process position in the transport direction,
among the plurality of rollers, fourth rollers are provided closest to the third rollers on an upstream side of the third rollers in the transport direction, and
the driving unit drives the third rollers and the fourth rollers to rotate so that a speed of a surface of the fourth roller is faster than a speed of a surface of the third roller at least while the sheet passes through the process position.

2. The transport device according to claim 1, further comprising:
a guide member that guides the sheet from the first rollers to the second rollers along the transporting path, and includes a collision surface provided at a position where a tip end of a sheet fed by the first rollers collides with the guide member.

3. The transport device according to claim 2, wherein
in a portion of the transporting path on which the guide member is provided, the transporting path on an upstream side in the transport direction of the collision surface is wider than the transporting path on the downstream side in the transport direction of the collision surface.

4. The transport device according to claim 3, wherein
the process position includes a first process position and a second process position which is positioned on a downstream side of the first process position in the transport direction,
fifth rollers that are the first rollers provided on a downstream side of the first process position are included,
sixth rollers that are the second rollers provided on a downstream side of the third rollers are included,
seventh rollers that are the third rollers provided on an upstream side of the second process position are included,
eighth rollers that are the fourth rollers provided on the downstream side of the third rollers are included, and
the driving unit drives the fifth and sixth rollers so that a speed of a surface of the fifth roller is faster than a speed of a surface of the sixth roller at least while the sheet passes through the first process position, and drives the seventh and eighth rollers so that a speed of a surface of the eighth roller is faster than a speed of a surface of the seventh roller at least after the sheet passes through the first process position.

5. The transport device according to claim 4, further comprising:
a first processor that performs a reading process of reading an image by scanning the sheet at the first process position; and
a second processor that performs the reading process by scanning the sheet at the second process position at a speed slower than a speed of the first processor,
wherein the driving unit drives the fifth, sixth, seventh, and eighth rollers so that the speed of the surface of the fifth roller is faster than the speed of the surface of the sixth roller, the speed of the surface of the sixth roller is equal to or faster than the speed of the surface of the eighth roller, and the speed of the surface of the eighth roller is faster than the speed of the surface of the seventh roller.

6. The transport device according to claim 4, wherein the driving unit drives the fifth and sixth rollers so that the speed of the surface of the fifth roller is faster than the speed of the surface of the sixth roller while the sheet passes through the first process position, and drives the seventh and eighth rollers so that the speed of the surface of the seventh roller is equal to the speed of the surface of the fifth roller and the speed of the surface of the eighth roller is faster than the speed of the surface of the seventh roller after the sheet passes through the first process position.

7. The transport device according to claim 4, further comprising:
a first conveying unit that includes a first conveyance passage along a first direction forming an angle with respect to a horizontal direction, and conveys a sheet in the first direction;
a returning conveyance unit that conveys the sheet conveyed by the first conveying unit towards a second direction having a component of an opposite direction to the first direction; and
a second conveying unit that includes a second conveyance passage along the second direction, and conveys the sheet conveyed by the returning conveyance unit in the second direction.

8. The transport device according to claim 7, wherein the first process position is provided in the first conveying unit, and
the second process position is provided in the second conveying unit.

9. The transport device according to claim 8, wherein a distance between the first process position and the returning conveyance unit is shorter than a distance between the second process position and the returning conveyance unit.

10. A transport system comprising:
the transport device according to claim 9; and
a post-processing device that performs a post-process on the sheet discharged from the transport device, the sheet being subjected to the processing by both of the first processor and the second processor.

11. The transport device according to claim 2, wherein the process position includes a first process position and a second process position which is positioned on a downstream side of the first process position in the transport direction,
fifth rollers that are the first rollers provided on a downstream side of the first process position are included,
sixth rollers that are the second rollers provided on a downstream side of the third rollers are included,
seventh rollers that are the third rollers provided on an upstream side of the second process position are included,
eighth rollers that are the fourth rollers provided on the downstream side of the third rollers are included, and
the driving unit drives the fifth and sixth rollers so that a speed of a surface of the fifth roller is faster than a speed of a surface of the sixth roller at least while the sheet passes through the first process position, and drives the seventh and eighth rollers so that a speed of a surface of the eighth roller is faster than a speed of a surface of the seventh roller at least after the sheet passes through the first process position.

12. The transport device according to claim 11, further comprising:
a first processor that performs a reading process of reading an image by scanning the sheet at the first process position; and
a second processor that performs the reading process by scanning the sheet at the second process position at a speed slower than a speed of the first processor,
wherein the driving unit drives the fifth, sixth, seventh, and eighth rollers so that the speed of the surface of the fifth roller is faster than the speed of the surface of the sixth roller, the speed of the surface of the sixth roller is equal to or faster than the speed of the surface of the eighth roller, and the speed of the surface of the eighth roller is faster than the speed of the surface of the seventh roller.

13. The transport device according to claim 11, wherein the driving unit drives the fifth and sixth rollers so that the speed of the surface of the fifth roller is faster than the speed of the surface of the sixth roller while the sheet passes through the first process position, and drives the seventh and eighth rollers so that the speed of the surface of the seventh roller is equal to the speed of the surface of the fifth roller and the speed of the surface of the eighth roller is faster than the speed of the surface of the seventh roller after the sheet passes through the first process position.

14. The transport device according to claim 1, wherein the process position includes a first process position and a second process position which is positioned on a downstream side of the first process position in the transport direction,
fifth rollers that are the first rollers provided on a downstream side of the first process position are included,
sixth rollers that are the second rollers provided on a downstream side of the third rollers are included,
seventh rollers that are the third rollers provided on an upstream side of the second process position are included,
eighth rollers that are the fourth rollers provided on the downstream side of the third rollers are included, and
the driving unit drives the fifth and sixth rollers so that a speed of a surface of the fifth roller is faster than a speed of a surface of the sixth roller at least while the sheet passes through the first process position, and drives the seventh and eighth rollers so that a speed of a surface of the eighth roller is faster than a speed of a surface of the seventh roller at least after the sheet passes through the first process position.

15. The transport device according to claim 7, further comprising:
a first processor that performs a reading process of reading an image by scanning the sheet at the first process position; and
a second processor that performs the reading process by scanning the sheet at the second process position at a speed slower than a speed of the first processor,
wherein the driving unit drives the fifth, sixth, seventh, and eighth rollers so that the speed of the surface of the fifth roller is faster than the speed of the surface of the sixth roller, the speed of the surface of the sixth roller is equal to or faster than the speed of the surface of the eighth roller, and the speed of the surface of the eighth roller is faster than the speed of the surface of the seventh roller.

16. The transport device according to claim 14, wherein the driving unit drives the fifth and sixth rollers so that the speed of the surface of the fifth roller is faster than the speed of the surface of the sixth roller while the sheet passes through the first process position, and drives the seventh and eighth rollers so that the speed of the surface of the seventh roller is equal to the speed of the surface of the fifth roller and the speed of the surface of the eighth roller is faster than the speed of the surface of the seventh roller after the sheet passes through the first process position.

* * * * *